United States Patent
Ni et al.

(10) Patent No.: US 11,396,810 B2
(45) Date of Patent: Jul. 26, 2022

(54) FULL-LENGTH SCREEN PIPE HOLE PROTECTION DEVICE AND METHOD WITH PRESSURIZED HOLE PACKING IN SOFT COAL SEAM

(71) Applicant: SHANDONG UNIVERSITY OF SCIENCE AND TECHNOLOGY, Qingdao (CN)

(72) Inventors: Guanhua Ni, Qingdao (CN); Kai Dong, Qingdao (CN); Weimin Cheng, Qingdao (CN); Jingna Xie, Qingdao (CN); Gang Wang, Qingdao (CN); Yixin Liu, Qingdao (CN); Qiming Huang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/596,840

(22) PCT Filed: Nov. 9, 2020

(86) PCT No.: PCT/CN2020/127434
§ 371 (c)(1),
(2) Date: Dec. 20, 2021

(87) PCT Pub. No.: WO2022/052289
PCT Pub. Date: Mar. 17, 2022

(65) Prior Publication Data
US 2022/0205361 A1    Jun. 30, 2022

(30) Foreign Application Priority Data
Sep. 14, 2020  (CN) .......................... 202010959471.0

(51) Int. Cl.
*E21F 7/00* (2006.01)
*C04B 28/26* (2006.01)
(Continued)

(52) U.S. Cl.
CPC ............ *E21F 7/00* (2013.01); *C04B 24/2641* (2013.01); *C04B 28/24* (2013.01); *C04B 28/26* (2013.01);
(Continued)

(58) Field of Classification Search
None
See application file for complete search history.

(56) References Cited

FOREIGN PATENT DOCUMENTS

| CN | 102775109 A | 11/2012 |
|---|---|---|
| CN | 110330284 A | 10/2019 |
| CN | 210918903 U | 7/2020 |

OTHER PUBLICATIONS

First Office Action issued in Chinese Patent Application No. 2020109594710; dated Feb. 20, 2021; 14 pgs.
(Continued)

*Primary Examiner* — Jeffrey D Washville
(74) *Attorney, Agent, or Firm* — Hauptman Ham, LLP

(57) ABSTRACT

A full-length screen pipe hole protection device and method with pressurized hole packing in a soft coal seam relates to the field of gas drainage technologies. The device includes a grouting system, a drainage system and a hole fixing system. The grouting system injects a pressurized sealing material into a borehole through a pressure pump to increase a sealing effect of the borehole. The drainage system drains gas in the middle of air holes on metal baffle plates and hole fixing screen pipes through a drainage pipe to increase flowability of gas. The hole fixing system is inside the borehole and fixed with the metal baffle plates, and the hole fixing screen pipes are fixedly connected with each other (Continued)

through fitting mouths and fitting buckles. The device is fixedly mounted in the gas drainage borehole. After hole packing, the drainage pipe is connected with a drainage pump to drain gas.

2 Claims, 1 Drawing Sheet

(51) Int. Cl.
| | |
|---|---|
| *C09K 3/10* | (2006.01) |
| *E21B 33/13* | (2006.01) |
| *E21B 43/00* | (2006.01) |
| *E21B 33/12* | (2006.01) |
| *E21B 43/08* | (2006.01) |
| *C04B 24/26* | (2006.01) |
| *C04B 28/24* | (2006.01) |
| *C04B 111/00* | (2006.01) |

(52) U.S. Cl.
CPC ............... *C09K 3/10* (2013.01); *E21B 33/12* (2013.01); *E21B 33/13* (2013.01); *E21B 43/006* (2013.01); *E21B 43/086* (2013.01); *C04B 2111/00008* (2013.01); *C04B 2111/00663* (2013.01); *C04B 2111/00724* (2013.01); *C09K 2003/1034* (2013.01); *C09K 2003/1087* (2013.01)

(56) References Cited

OTHER PUBLICATIONS

Second Office Action issued in Chinese Patent Application No. 2020109594710; dated May 13, 2021; 18 pgs.
Search Report issued in Chinese Patent Application No. 2020109594710; dated Feb. 5, 2021; 4 pgs.
Notification of Grant issued in Chinese Patent Application No. 2020109594710; dated Aug. 9, 2021; 4 pgs.
International Search Report and Written Opinion issued in International Patent Application No. PCT/CN2020/127434; dated Oct. 6, 2021; 16 pps.

FULL-LENGTH SCREEN PIPE HOLE PROTECTION DEVICE AND METHOD WITH PRESSURIZED HOLE PACKING IN SOFT COAL SEAM

RELATED APPLICATIONS

The present application is a U.S. National Phase of International Application Number PCT/CN2020/127434 filed Nov. 9, 2020, and claims priority to Chinese Application Number 2020109594710 filed Sep. 14, 2020.

TECHNICAL FIELD

The present invention relates to the field of gas drainage technologies, and in particular to a full-length screen pipe hole protection device and method with pressurized hole packing in a soft coal seam.

BACKGROUND

In coal mining processes, because coal seam storage conditions are complex and changeable, coal disasters occurs frequently, thus leading to severe gas accidents. The coal seam gas is an associated mineral resource of the coal, and belongs to an unconventional natural gas as well as a clean and excellent energy and chemical material. Reasonable utilization of mine gas will be significant for reduction of mine gas accidents and environment protection. Gas drainage is a simple and efficient method of eliminating gas outbursts, where a borehole drainage method is the most popular one. However, the outburst coal seams and tectonic coals in some mines are soft, mining depth is large, high stress release and transfer and strong load action bring about coal rock mass breakage and a large-scope extraction generates repeated disturbances to the coal rock masses. In this case, the coal rock masses are subjected to multiple deformations and failures. Under the influence of surrounding rock stress field, gas pressure and coal mass original fissures of a drivage roadway, the structures of hole walls of the borehole are subjected to shear failures and tensile failure instability, and the gas drainage borehole is easy to collapse. Especially the boreholes in stress concentration segments or local tectonic stress concentration segments before a working face or at both sides of the roadway will collapse and may be plugged in a short period, greatly reducing an effective drainage time of the borehole in the borehole gas drainage, and severely affecting a borehole gas drainage efficiency. Therefore, it is required to make further improvement on the existing gas drainage device and method.

SUMMARY

In order to prevent borehole collapse resulting from soft coal mass, large mining depth and high stress, improve gas drainage efficiency and guarantee the safety of gas drainage, the present invention provides a full-length screen pipe hole protection device and method with pressurized hole packing in a soft coal seam. The specific technical solution is described below.

Provided is a full-length screen pipe hole protection device with pressurized hole packing in a soft coal seam, including a drainage pipe, a sealing plug, a grouting pressure pump, a grouting pipe, a grout discharge pipe, a plurality of hole fixing screen pipes, and a plurality of metal baffle plates. The hole fixing screen pipes are fixed to a hole wall of a gas drainage borehole through the metal baffle plates, and the plurality of hole fixing screen pipes are fixedly connected sequentially by head-tail connection. The sealing plug is disposed in a hole mouth segment of the gas drainage borehole, and a sealed space is formed between two sealing plugs. The grouting pressure pump is connected to the grouting pipe protruded into the sealed space, and the grout discharge pipe is in communication with the sealed space. The drainage pipe is penetrated through the sealed space, the hole fixing screen pipes and the metal baffle plates.

Preferably, a fitting mouth is disposed at one end of the hole fixing screen pipe, and a fitting buckle is disposed at the other end of the hole fixing screen pipe. The fitting mouth and the fitting buckle cooperate with each other.

Preferably, a plurality of air holes are disposed uniformly on the metal baffle plate and the hole fixing screen pipe respectively. A drainage hole is disposed at the centers of the metal baffle plate and the sealing plug respectively, and a pipe diameter of the drainage pipe is equal to a hole diameter of the drainage hole.

Preferably, a sealing ring is disposed at both ends of the hole fixing screen pipe.

Preferably, a pressurized sealing material is filled in the sealed space. The ingredients of the pressurized sealing material include: a silicate cement, a nano-silicon dioxide, sodium silicate, a styrene acrylic emulsion and water.

Provided is a full-length screen pipe hole protection gas drainage method with pressurized hole packing in a soft coal seam, employing the above full-length screen pipe hole protection device with pressurized hole packing in a soft coal seam. The method includes the following steps A-G:

at step A, fixedly connecting the drainage pipe with the metal baffle plates and placing into a gas drainage borehole;

at step B, placing the hole fixing screen pipes into the gas drainage borehole along the drainage pipe, and fixedly connecting the hole fixing screen pipes with the metal baffle plates;

at step C, sequentially connecting the metal baffle plates with the hole fixing screen pipes;

at step D, after the hole fixing screen pipes are mounted, disposing a sealing plug at an inner side of a hole mouth segment of the gas drainage borehole, where the sealing plug is closely attached to the metal baffle plate;

at step E, disposing a sealing plug at a hole mouth position of the gas drainage borehole so that the two sealing plugs form a sealed space;

at step F, connecting the grouting pipe and the grouting pressure pump such that the grouting pressure pump injects a pressurized sealing material into the sealed space through the grouting pipe and stops injection when the grout discharge pipe discharges grout;

at step G, completing hole packing, and connecting the drainage pipe with a gas drainage system to carry out gas drainage.

Further preferably, a pipe mouth of the grouting pipe is protruded to an inner side of the sealed space and a pipe mouth of the grout discharge pipe is protruded out of the sealed space.

Further preferably, in the pressurized sealing material, a mass ratio of water to the silicate cement is 0.4, an addition amount of the nano-silicon dioxide is 4% of a mass of the silicate cement, an addition amount of sodium silicate is 0.5% of the mass of the silicate cement, and an addition amount of the styrene acrylic emulsion is 2% of the mass of the silicate cement.

Further preferably, when the pressurized sealing material is prepared, the nano-silicon dioxide, sodium silicate and the styrene acrylic emulsion are firstly mixed with water and stirred for 3 minutes and then added with the silicate cement, and then stirred until the materials are uniformly mixed.

The full-length screen pipe hole protection device and method with pressurized hole packing in a soft coal seam according to the present invention have the following beneficial effects. In the device, a space in the borehole is supported through the hole fixing screen pipes and the metal baffle plates to ensure flowability of gas in the drainage pipe, and the sealed space is formed by use of the sealing plugs in the hole mouth segment of the borehole and filled with the pressurized sealing material so as to increase the sealing effect. The method of arranging a gas drainage borehole using the device features advantages such as convenient construction, good hole protection effect and high drainage efficiency.

Numerals of the drawings are described below: 1—drainage pipe, 2—sealing plug, 3—grouting pressure pump, 4—grouting pipe, 5—grout discharge pipe, 6—hole fixing screen pipe, 7—metal baffle plate, 8—sealing ring, 9—fitting mouth, 10—fitting buckle, 11—air hole, 12—gas drainage borehole, 13—sealed space, 14—drainage hole.

DETAILED DESCRIPTION OF THE EMBODIMENTS

Figure 1:
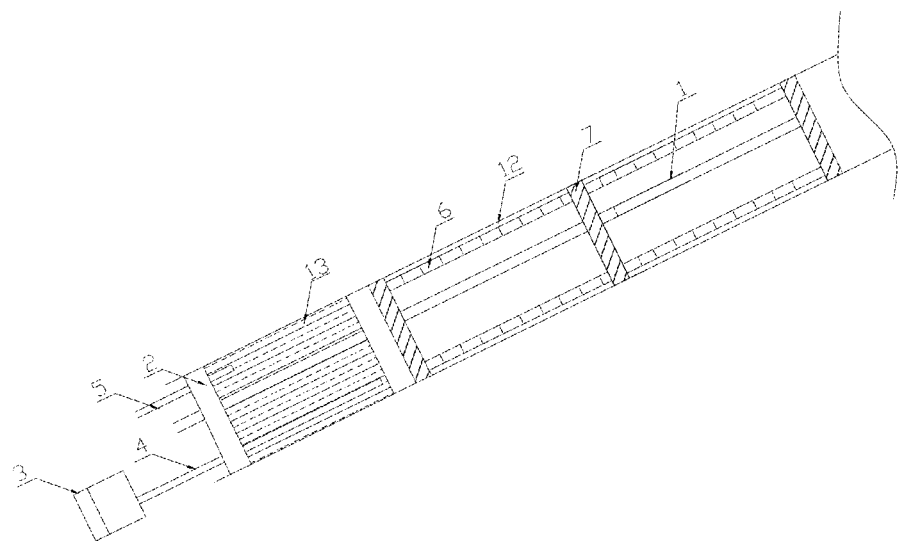
FIG. 1 is a structural schematic diagram of a full-length screen pipe hole protection device with pressurized hole packing in a soft coal seam.
Figure 2:
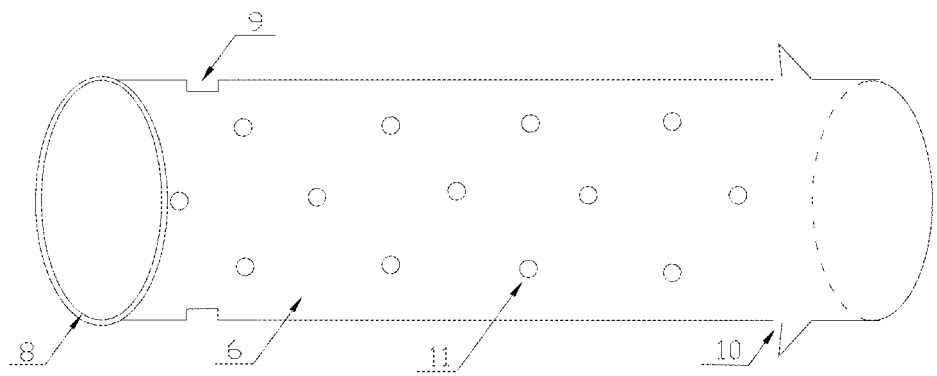
FIG. 2 is a structural schematic diagram of a hole fixing screen pipe.
Figure 3:
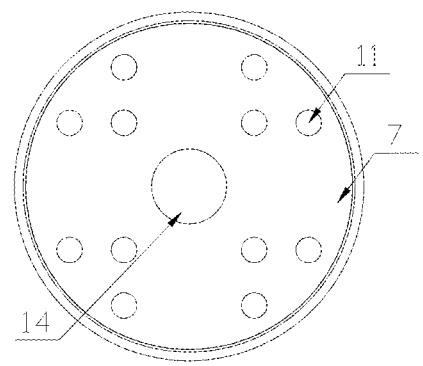
FIG. 3 is a structural schematic diagram of a metal baffle plate.

By referring to FIGS. 1-3, a full-length screen pipe hole protection device and method with pressurized hole packing in a soft coal seam according to the present invention will be described in combination with the specific embodiments.

Provided is a full-length screen pipe hole protection device with pressurized hole packing in a soft coal seam. The device includes a grouting system, a drainage system and a hole fixing system. The grouting system injects a pressurized sealing material into a borehole through a pressure pump to increase a sealing effect of the borehole. The drainage system drains gas in the middle of air holes on metal baffle plates and hole fixing screen pipes through a drainage pipe to increase flowability of gas. The hole fixing system is positioned inside the borehole and fixed with the metal baffle plates, and the hole fixing screen pipes are fixedly connected with each other through fitting mouths and fitting buckles. The device is fixedly mounted in the gas drainage borehole. After hole packing is completed, the drainage pipe is connected with a drainage pump to carry out gas drainage.

The structure of the device specifically includes a drainage pipe 1, a sealing plug 2, a grouting pressure pump 3, a grouting pipe 4, a grout discharge pipe 5, a plurality of hole fixing screen pipes 6, and a plurality of metal baffle plates 7. The grouting pressure pump 3 is arranged outside a gas drainage borehole 12, the sealing plug 2 seals the borehole in cooperation with the grouting pipe 4 and the group discharge pipe 5, and the drainage pipe 1 is fixed in the gas drainage borehole through the hole fixing screen pipes 6 and the metal baffle plates 7 for gas drainage.

The hole fixing screen pipes 6 are fixed to a hole wall of the gas drainage borehole 12 through the metal baffle plates 7. A plurality of hole fixing screen pipes 6 are fixedly connected in sequence by head-tail connection. The hole fixing screen pipe 6 is approximate in diameter to the gas drainage borehole 12 but slightly less than the diameter of the gas drainage borehole. The metal baffle plates 7 are disposed at the connections of ends of a plurality of hole fixing screen pipes. The sealing plug 2 is disposed in a hole mouth segment of the gas drainage borehole. Two sealing plugs 2 form a sealed space 13 where the pressurized sealing material is injected for hole packing. The grouting pressure pump is connected with the grouting pipe protruding into the sealed space, and the grout discharge pipe is in communication with the sealed space. When the grouting pipe 4 injects the pressurized sealing material into the sealed space, the grout discharge pipe 5 is used to determine whether the sealed space is filled up with the pressurized sealing material. The drainage pipe 1 is penetrated through the sealed space, the hole fixing screen pipes and the metal baffle plates, and then fixed along an axis of the gas drainage borehole, thereby facilitating the gas drainage.

A fitting mouth is disposed at one end of the hole fixing screen pipe 6 and a fitting buckle is disposed at the other end of the hole fixing screen pipe 6, such that the hole fixing screen pipes can be easily connected with each other through the fitting mouths and the fitting buckles. A plurality of air holes 11 are uniformly disposed on each of the metal baffle plates 7 and the hole fixing screen pipes 6 to facilitate gas circulation, thereby increasing the gas drainage efficiency. A drainage hole 14 is disposed at the centers of the metal baffle plates and the sealing plugs. A pipe diameter of the drainage pipe 1 is made equal to a hole diameter of the drainage hole 14 to facilitate fixing the drainage pipe. A rubber sealing ring is disposed at both ends of the hole fixing screen pipe 6 to ensure sealing performance of connection positions.

The pressurized sealing material is filled in the sealed space 13. The ingredients of the pressurized sealing material include: a silicate cement, a nano-silicon dioxide, sodium silicate, a styrene acrylic emulsion and water. The sealing material has good flowability, compactness, viscosity and mechanical strength, so as to seal up borehole fissures in a drainage process, eliminate or reduce stress around the boreohole and avoid device deformation or even breakage.

Provided is a full-length screen pipe hole protection gas drainage method with pressurized hole packing in a soft coal seam, employing the above full-length screen pipe hole protection device with pressurized hole packing in a soft coal seam. The method includes the following steps.

At step A, the drainage pipe is fixedly connected with the metal baffle plates and then placed into a gas drainage borehole, where a length of the drainage pipe is determined based on a length of the gas drainage borehole, and a pipe diameter of the gas drainage pipe is generally smaller than a hole diameter of the gas drainage borehole.

At step B, the hole fixing screen pipes are placed into the gas drainage borehole along the drainage pipe, and then fixedly connected with the metal baffle plates, where a length of the hole fixing screen pipe is determined based on the length of the gas drainage borehole and each hole fixing screen pipe usually has a length of 1-3 cm. Air holes are uniformly distributed on the hole fixing screen pipe to increase gas circulation in the gas drainage borehole.

At step C, the metal baffle plates are connected with the hole fixing screen pipes in sequence until all hole fixing screen pipes are arranged. Every two hole fixing screen pipes are fixedly connected by a metal baffle plate.

At step D, after the hole fixing screen pipes are mounted, a sealing plug is disposed at an inner side of a hole mouth segment of the gas drainage borehole, where the sealing plug is closely attached to the metal baffle plate. The firstly-mounted sealing plug is closely attached to the outermost metal baffle plate in the borehole to ensure structural stability in the borehole, where a direction from a hole bottom of the borehole to a hole mouth of the borehole is an outward direction and a direction from the hole mouth to the hole bottom is an inward direction.

At step E, a sealing plug is disposed at a hole mouth position of the gas drainage borehole so that the two sealing plugs form a sealed space. The flow of a pressurized sealing material is limited by disposing the two sealing plugs so as to form a hole packing structure of the gas drainage borehole. A pipe mouth of the grouting pipe is protruded to an inner side of the sealed space to preferentially deliver grout to the inner side of the borehole. A pipe mouth of the grout discharge pipe is protruded out of the sealed space to determine whether the sealed space is full in time.

At step F, the grouting pipe and the grouting pressure pump are connected such that the grouting pressure pump injects the pressurized sealing material into the sealed space through the grouting pipe and stops injection when the grout discharge pipe discharges grout. In the pressurized sealing material, a mass ratio of water to the silicate cement is 0.4, an addition amount of the nano-silicon dioxide is 4% of a mass of the silicate cement, an addition amount of sodium silicate is 0.5% of the mass of the silicate cement, and an addition amount of the styrene acrylic emulsion is 2% of the mass of the silicate cement. When the pressurized sealing material is prepared, the nano-silicon dioxide, sodium silicate and the styrene acrylic emulsion are firstly mixed with water and stirred for 3 minutes and then added with the silicate cement, and then stirred until the materials are uniformly mixed. The pressurized sealing material solves the problems of water loss shrinkage, rich fissures, and poor sealing effect while retaining the advantages of a cement-based material such as compression resistance, shear resistance and strong strength. The styrene acrylic emulsion, the nano-silicon dioxide and sodium silicate can cooperatively improve compactness and strength of the material, and reduce fissures and pores in the material significantly. The styrene acrylic emulsion increases an elastic modulus of the material and enhances a capability of the material to resist external negative factors.

At step G, hole packing is completed and the drainage pipe is connected with a gas drainage system to carry out gas drainage.

This method not only solves the problem of borehole collapse resulting from coal property, mining depth and stress and the like, but also increases gas drainage efficiency and reduces probability of occurrence of gas accidents.

Of course, the above descriptions are not intended to limit the present invention and the present invention is also not limited to the above embodiments. Any changes, modifications, additions or substitutions made by those skilled in the art within the essence of the present invention shall all fall within the scope of protection of the present invention.

The invention claimed is:

1. A full-length screen pipe hole protection gas drainage method with pressurized hole packing in a soft coal seam, employing a full-length screen pipe hole protection device with pressurized hole packing in a soft coal seam comprising a drainage pipe, a sealing plug, a grouting pressure pump, a grouting pipe, a grout discharge pipe, a plurality of hole fixing screen pipes, and a plurality of metal baffle plates; the hole fixing screen pipes are fixed to a hole wall of a gas drainage borehole through the metal baffle plates, and the plurality of hole fixing screen pipes are fixedly connected sequentially by head-tail connection; the sealing plug is disposed in a hole mouth segment of the gas drainage borehole, and a sealed space is formed between two sealing plugs; the grouting pressure pump is connected to the grouting pipe, the grouting pipe is protruded into the sealed space, and the grout discharge pipe is in communication with the sealed space; the drainage pipe is penetrated through the sealed space, the hole fixing screen pipes and the metal baffle plates; a plurality of air holes are disposed uniformly on the metal baffle plate and the hole fixing screen pipe respectively; a drainage hole is disposed at the centers of the metal baffle plate and the sealing plug respectively, wherein a pipe diameter of the drainage pipe is equal to a hole diameter of the drainage hole; a pressurized sealing material is filled in the sealed space; the ingredients of the pressurized sealing material comprise: a silicate cement, a nano-silicon dioxide, sodium silicate, a styrene acrylic emulsion and water; a fitting mouth is disposed at one end of the hole fixing screen pipe, and a fitting buckle is disposed at the other end of the hole fixing screen pipe; the fitting mouth and the fitting buckle cooperate with each other; a sealing ring is disposed at both ends of the hole fixing screen pipe;

wherein the method specially comprises:
at step A, fixedly connecting the drainage pipe with the metal baffle plates and placing into a gas drainage borehole;
at step B, placing the hole fixing screen pipes into the gas drainage borehole along the drainage pipe, and fixedly connecting the hole fixing screen pipes with the metal baffle plates;
at step C, sequentially connecting the metal baffle plates with the hole fixing screen pipes; wherein a length of the hole fixing screen pipe is determined based on a length of the gas drainage borehole, each hole fixing screen pipe has a length of 1-3 m, and air holes are uniformly disposed on the hole fixing screen pipes;
at step D, after the hole fixing screen pipes are mounted, disposing a sealing plug at an inner side of a hole mouth segment of the gas drainage borehole, wherein the sealing plug is closely attached to the metal baffle plate; wherein the sealing plug firstly mounted is closely attached to the outermost metal baffle plate of the borehole to ensure stability of in-borehole structure, a direction from a hole bottom of the borehole to a hole mouth of the borehole is an outward direction and a direction from the hole mouth to the hole bottom is an inward direction;
at step E, disposing a sealing plug at a hole mouth position of the gas drainage borehole so that the two sealing plugs form a sealed space;
at step F, connecting the grouting pipe and the grouting pressure pump such that the grouting pressure pump injects a pressurized sealing material into the sealed space through the grouting pipe and stops injection when the grout discharge pipe discharges grout; wherein in the pressurized sealing material, a mass ratio of water to the silicate cement is 0.4, an addition amount of the nano-silicon dioxide is 4% of a mass of the silicate cement, an addition amount of sodium silicate is 0.5% of the mass of the silicate cement, and an addition amount of the styrene-acrylate emulsion is 2% of the mass of the silicate cement; when the pressurized sealing material is prepared, the nano-silicon dioxide, sodium silicate and the styrene-acrylate emulsion are firstly mixed with water and stirred for 3 minutes and then added with the silicate cement, and then stirred until the materials are uniformly mixed;

at step G, completing hole packing, and connecting the drainage pipe with a gas drainage system to carry out gas drainage.

2. The method of claim 1, wherein a pipe mouth of the grouting pipe is protruded to an inner side of the sealed space and a pipe mouth of the grout discharge pipe is protruded out of the sealed space.

* * * * *